April 2, 1935.  W. J. BIGLEY, JR  1,996,695
TRANSPORTATION METHOD AND MEANS
Filed May 9, 1933   6 Sheets-Sheet 1

April 2, 1935.  W. J. BIGLEY, JR  1,996,695
TRANSPORTATION METHOD AND MEANS
Filed May 9, 1933  6 Sheets-Sheet 2

April 2, 1935. W. J. BIGLEY, JR 1,996,695
TRANSPORTATION METHOD AND MEANS
Filed May 9, 1933  6 Sheets-Sheet 3

INVENTOR
William J. Bigley Jr.
BY
ATTORNEY

April 2, 1935.  W. J. BIGLEY, JR  1,996,695
TRANSPORTATION METHOD AND MEANS
Filed May 9, 1933   6 Sheets-Sheet 4

April 2, 1935.  W. J. BIGLEY, JR  1,996,695
TRANSPORTATION METHOD AND MEANS
Filed May 9, 1933   6 Sheets-Sheet 5

INVENTOR
William J. Bigley Jr
BY
ATTORNEYS

April 2, 1935.  W. J. BIGLEY, JR  1,996,695
TRANSPORTATION METHOD AND MEANS
Filed May 9, 1933  6 Sheets-Sheet 6

INVENTOR
William J. Bigley Jr.
BY
Cushman, Darby & Cushman
ATTORNEYS

Patented Apr. 2, 1935

1,996,695

UNITED STATES PATENT OFFICE 1,996,695

TRANSPORTATION METHOD AND MEANS

William J. Bigley, Jr., Hoboken, N. J.

Application May 9, 1933, Serial No. 670,162

6 Claims. (Cl. 280—144)

Heretofore considerable difficulty has been experienced in the transportation of girders of excessive size either by rail or by road and particularly through city streets where sharp turns, frequently more or less obstructed, have to be made. The practice has been to transport girders on their sides so that maneuvering has been made difficult, particularly where the girders were of any great depth and length. Moreover, girders of considerable length, when transported in this position, have often been damaged due to warping as the result of sagging between their supporting elements. For this reason, there have heretofore been very definite limitations as to the size of girders which could be transported.

Frequently girders are equipped, upon final installation, with a relatively fragile superstructure, such as a railing. While such a railing could be associated with the girder with the greatest facility at the factory, it has been impossible to do this, under present practice, due to the impossibility of safety handling and transporting the complete assembly.

The present invention relates to method and means whereby girders of maximum size may be transported without damage thereto, with the capability of maneuvering under almost any conditions likely to be encountered, and with relatively fragile subsidiary structure associated therewith. Primarily, the invention contemplates the support of the girder at each end and on a pair of wheeled elements, to one or both of which traction may be applied. The invention includes essentially means for supporting the girder securely on its edge and for turning with respect to the supporting means. For road transportation, the supporting means are in the form of multiple wheeled trucks or trailers which, in preferred form, embody particular construction enhancing their strength and maneuverability.

Since the invention will be best understood from a description of specific apparatus, I shall proceed to describe it with reference to the accompanying drawings, in which.

Referring to the drawings, and first of all to Figures 1, 2, and 5 to 8, reference numeral 25 designates generally a forward trailer and reference numeral 26 a rear trailer which support adjacent its ends a girder 27 on edge. While specifically a truss, element 27 is referred to as a girder since the latter term will be used generically herein. Except for means adapting them particularly to the uses contemplated under the present invention, trailers 25 and 26 are of well known construction. The trailer 25 has a rear horizontal platform portion supported at its rear end, as here shown, by a single transverse series of wheels 28. The trailer has an upwardly offset tongue portion 29 at its forward end, the forward end of the tongue portion being supported on a truck 30 and pivoted thereto on a vertical axis, the axis being defined by a king bolt through which traction is applied to the trailer.

Figure 5:
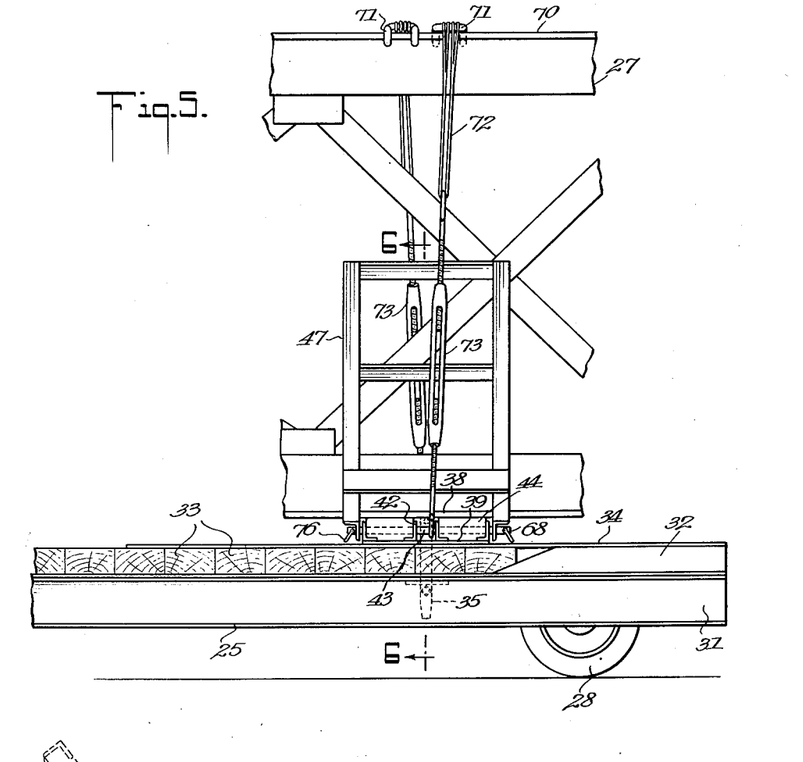
Figure 5 is an enlarged elevational view of a portion of the front trailer element shown in Figures 1 and 2.

Referring particularly to Figure 5, the trailer frame comprises side members as at 31 above which project wheel guards as at 32, the wheel guards having horizontal top edges. Forwardly of the wheel guards, planking 33 is laid across the side frame members, the top surface of the planking being in the plane of the top edges of the wheel guards. A heavy plate 34 is fastened on top of the wheel guards 32 and the planking 33, this plate, somewhat forwardly of the wheels 28, being provided midway between the sides of the trailer with an aperture which receives a king pin 35, the latter extending downwardly through an aperture in the planking and through registering apertures in a sub-plate 36 and a reinforcing plate 37 welded to the bottom of the latter.

Figure 6:
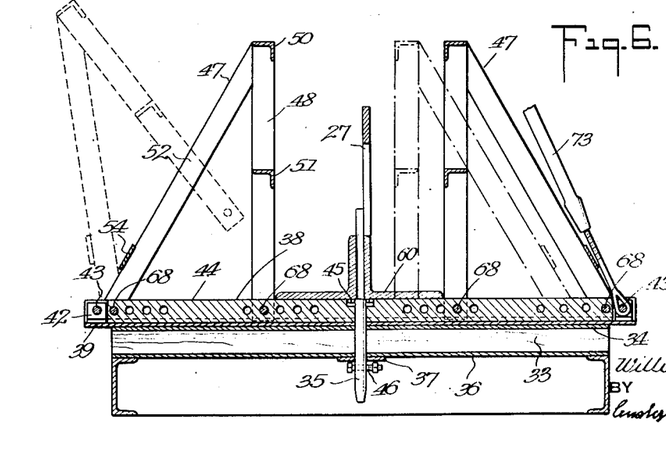
Figure 6 is a section on line 6—6 of Figure 5.

A bolster 38 is mounted on plate 34 for relative swinging movements about king pin 35. The bolster comprises a channel member which normally extends transversely of the trailer, and projects, as shown in Figure 6, slightly beyond the sides of the latter. As here shown, the channel member is made up of a flat bottom plate 39 and angle bars 40 and 41 secured along its upper margins and coextensive in length therewith. Pairs of ears 42 are secured to the top of plate 39 at its ends, these ears including upstanding portions provided with registering apertures. Between angle bars 40 and 41 is provided a filler or planking or similar material 44, whose top surface stands somewhat above the upper edges of the angle bars. Centrally, the planking 44 and plate 39 are apertured to receive the king pin 35 whose top end is inset in a counterbore in the planking so that the upper extremity of the king pin is flush with or somewhat below the top surface of the planking. An abutment element 45 secured to the upper end of the king pin holds the latter against gravity, while a bolt 46 passed through the king pin below plate 37 holds the pin against upward displacement.

The plate 39 has a large bearing on the plate 34 and the latter is of sufficient size as to underlie plate 39 in all possible swinging positions of the latter about king pin 35. In order to reduce friction the top of plate 34 is thoroughly greased within the range of swing of the bolster.

The girder 27 rests on bolster 38 immediately above the king pin and in perpendicular relation to the bolster. Particular means are associated with the bolster to prevent lateral tilting of the girder, which, as before mentioned, rests on its edge and must thus be securely braced.

For this purpose, I provide a pair of triangular racks or frames 47 which are secured to the bolster in proper position, one at each side of the king pin, so as to position at least the lower position of the girder. Frames 47 are of identical construction so that a description of one will suffice.

Figures 7, 8, 14:
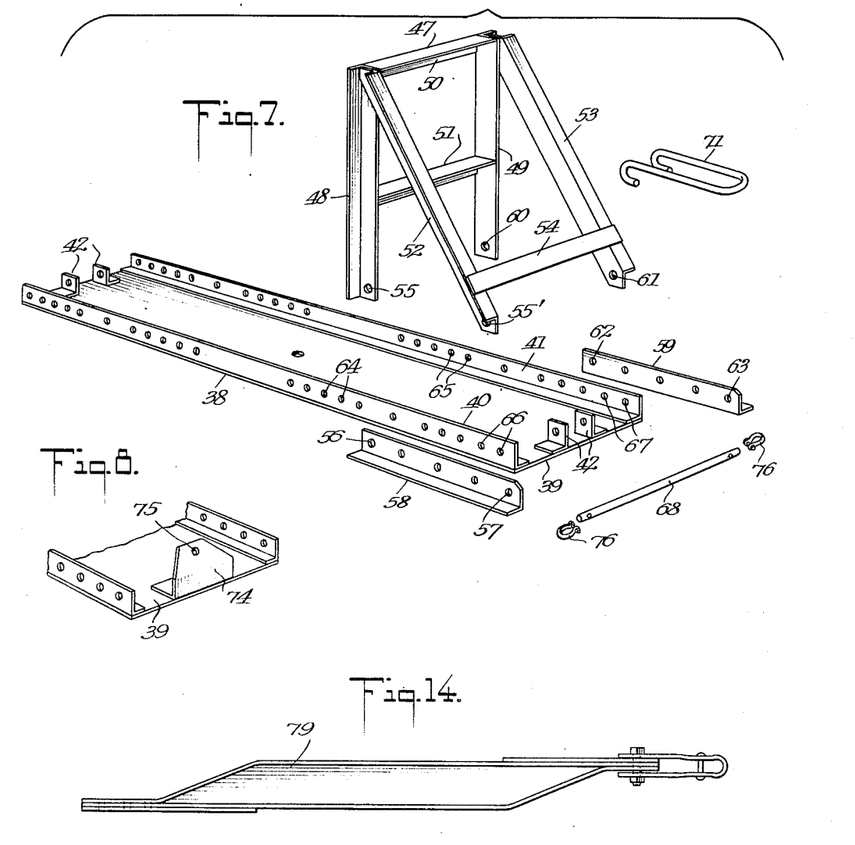
Figure 7 is a perspective of certain elements appearing in Figures 5 and 6.
Figure 8 is a fragmentary view showing a modification in detail of one of the elements appearing in Figure 7.
Figure 14 is an elevation of the trailer tongue or drawbar shown in Figures 3 and 4.

Referring particularly to Figures 5, 6, and 7, each frame 47 comprises a vertical portion made up of upright angles 48 and 49 and top and intermediate cross angles 50 and 51. Secured to the upper end of uprights 48 and 49 are oblique angle bars 52 and 53 joined at their lower ends by cross member 54. All of these members are preferably secured together by welding. The lower ends of angle members 48 and 52 have apertures 55 and 55' therein. The length of the cross members 50, 51 and 54 is such that the frame 47 may be set over bolster 38 with the lower ends of members 48 and 52 positioned somewhat outwardly of angles 40 and 41, respectively. As most clearly shown in Figure 7, angles 40 and 41 are provided with series of registering apertures 64, 65 and 66, 67. The corresponding apertures of series 64 and 66 are spaced apart the same distance as apertures 55 and 55' of members 48 and 52, so that the latter may be brought into register with selected apertures of anchor 40. Thus, depending upon the width of the girder, the two frames 47 will be positioned along the bolster and secured by passing pins 68 through the registering apertures of the bolster and the foot portions of the frames.

A considerable adjustment range for frames 47 is desirable since in many instances it is possible to haul two or more girders together. In cases where it is desirable to provide a wider space between the frames than that afforded when the frames are in their outermost positions on the girder, I utilize extension pieces as shown at 58 and 59, Figure 7. These pieces may have end apertures 56, 57 and 62, 63 spaced as apertures 55, 55' and 60, 61. A pin 68 may be passed through apertures 56, 55, an aperture 66, an aperture 67, and apertures 60 and 62 to unite the extension pieces, frame and bolster, and another pin 68 may be passed through apertures 57, 55' and 63, 61 to unite the frame and outer extension ends. A further pin 68 is passed through intermediate apertures of the extension pieces and aligned ones of apertures 66 and 67 to hold the extension pieces rigidly in horizontally projecting relation to the bolster.

It will be understood that by properly spacing the apertures in the extension pieces they may be secured to the bolster ends to project the desired distance therebeyond. Further, the frames 47 may be adjusted relative to the extensions without changing the position of the latter. For example, apertures 55' and 61 might be positioned to register with intermediate apertures of the extension pieces so that apertures 55 and 60 would come into register with apertures in angles 40 and 41 inwardly of the inner ends of the extension pieces. The various possible relations of the parts to secure the desired results can be readily selected so that further discussion here is unnecessary.

The girder rests firmly on bolster 38, due to the fact that rivet heads on its lower face embed themselves in the relatively soft planking of the bolster to resist relative movement of the girder and bolster. The edges of the lower web 69 of the girder abut the upright portions of frames 47 so that the lower portion of the girder is held securely against transverse movement. Blocks may be placed between the upper portions of the frames and the central web of the girder to steady the latter. Of course, if the girder has side plates flush with the lower edges of web 69, these are engaged by the upper portions of frame 47 to provide additional support.

However, additional support for the upper portion of the girder is preferably provided by braces or guys which connect the upper web 70 of the girder with the outer ends of the bolster. Such braces are conveniently constituted by tensionable, flexible elements, such as are shown in Figures 1, 2, 5 and 6. Referring to these figures reference numeral 71 designates a grapple which is adapted to grip under web 70 on one side thereof and to extend over and across and project beyond the other side thereof. The projecting portion of the grapple has a loop of cable 72 secured thereto, which is in turn connected to a turn buckle 73, the other end of the turn buckle being engaged between ears 42 with a pin 68 which passes through the apertures of the ears as well as through the bolster. One of the described braces connects each end of the bolster, through ears 42, with the top of the girder, and it will be understood that by suitably adjusting the turn buckles, the girder may be rigidly secured in upright position. Due to the distance of ears 42 from the girder, the mechanical advantage of the bracing system is such as to afford rigid support for girders of great depth without undue strain on the parts. Where a plurality of girders are being carried, a grapple is engaged with the outer edge of each outer girder, as will be understood, so that upon tensioning the guy elements the girders are drawn together as a unit. If the guy elements break under severe strain the girder or guides are still maintained on edge by the frames 47 and under some circumstances, the guy elements may be entirely omitted.

Instead of connecting the lower ends of the braces to the bolster through ears 42 and the bolts or pins supported thereby, they may be secured to cleats, as at 74, Figure 8, these cleats having horizontal portions fixed to the bolster plate 39 and an upstanding portion which, at its extremity, is somewhat inwardly inclined and provided with an aperture 75 in which the lower end of the brace is engaged. As shown in Figure 7, pins 68 may have their projecting ends apertured and engaged by shackles 76 to prevent their axial displacement.

Figures 3, 4:
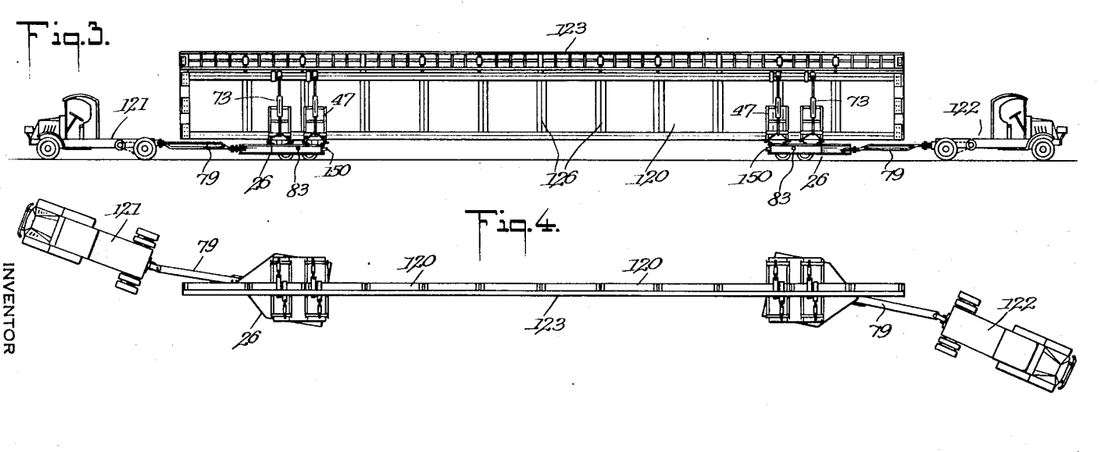
Figure 3 is an elevation of a modified form of road apparatus.
Figure 4 is a plan view of the apparatus of Figure 3.
Figure 15:
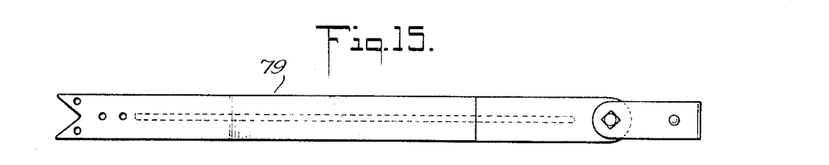
Figure 15 is a plan view of the tongue of Figure 14.

The trailer 26, as here shown, has two series of wheels 77 and 78 arranged in tandem. This trailer is of exactly the same construction as the trailers shown in Figures 3 and 4 with the exception that the latter are provided with extension tongues 79, which are shown alone in Figures 14 and 15. In Figures 3 and 4, the trailers are generally designated by the reference numeral 26, as in Figure 1, and these will be described with particular reference to Figures 9 to 19.

Each truck unit 26 comprises a rectangular main frame composed essentially of side members 80, and cross members 82, all of these being conveniently in the form of channels, and a central longitudinal member 81 extends between the cross members.

Figure 16:
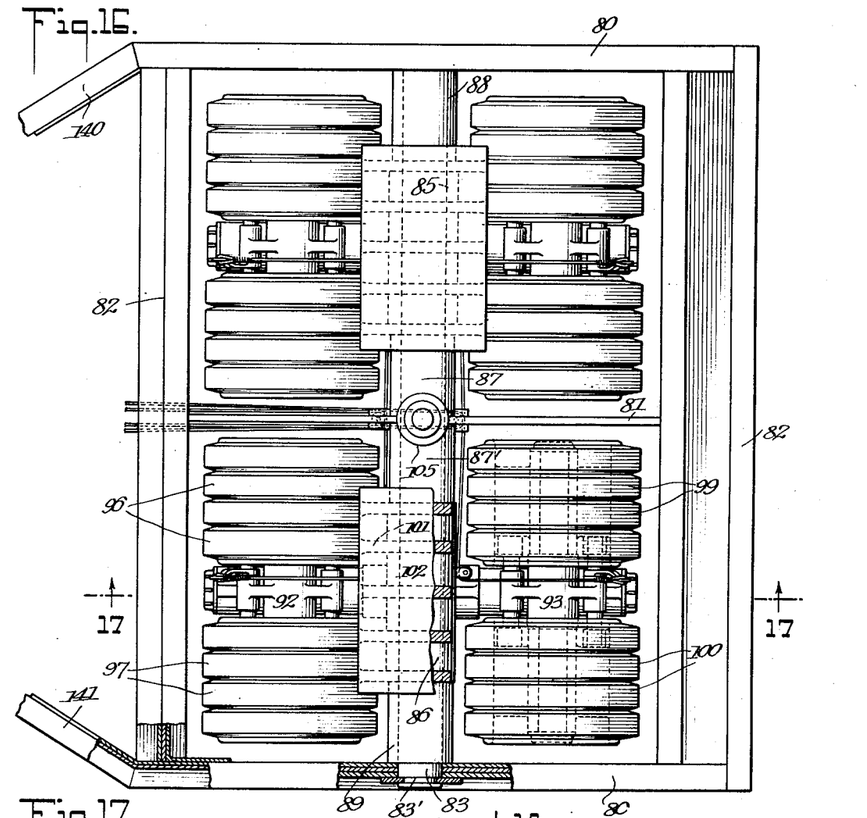
Figure 16 is a plan view of the trailer of Figures 3 and 4, with parts removed to reveal the running gear.
Figure 17:
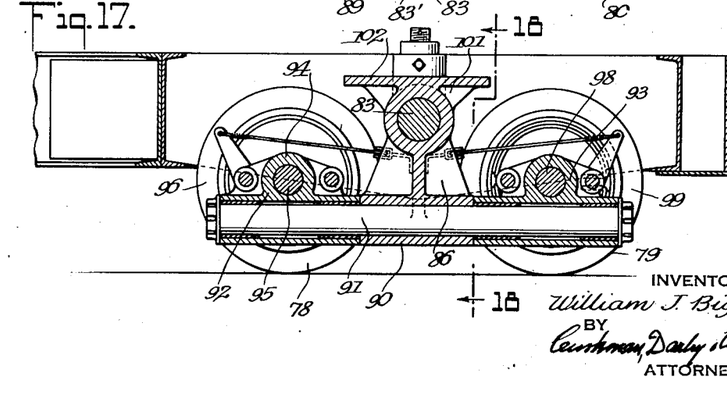
Figure 17 is a section on line 17—17 of Figure 16.
Figure 18:
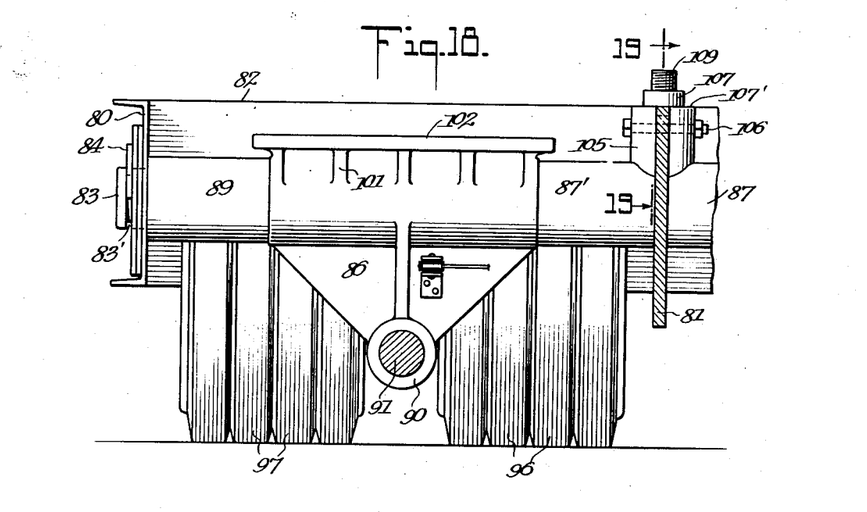
Figure 18 is a section on line 18—18 of Figure 17.
Figure 19:
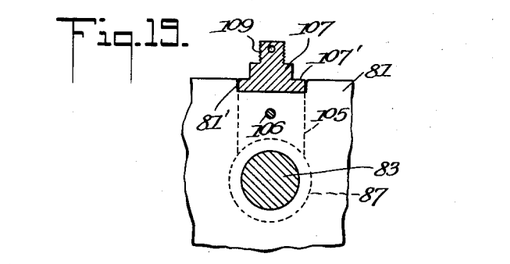
Figure 19 is a section on line 19—19 of Figure 18.

Journaled in the longitudinal members 80 and 81 of the main frame is a heavy shaft 83, members 80 being suitably thickened by auxiliary plates to provide proper bearing surface. As shown in Figure 16, the ends of shaft 83 may be provided with annular grooves 83' in which are engaged clips as at 84 which are fixed to the longitudinal members 80, the clips preventing axial displacement of the shaft. Shaft 83 passes through tubular portions of a pair of pedestals 85 and 86, these pedestals being held in spaced relation by means of central tubular spacers 87 and 87' and end spacers 88 and 89 strung on shaft 83. As shown most clearly in Figure 17, pedestal 86 has a tubular bearing portion 90 below shaft 83, the axial line of bearing portion 90 lying in a plane perpendicular to shaft 83.

A shaft 91 engaged in bearing portion 90 of pedestal 86 has its ends engaged in journal portions of blocks 92 and 93. Block 92 has a journal portion 94 in which is received an axle 95 above shaft 91 with its axis in a plane perpendicular to shaft 91. Mounted on the ends of axle 95 are the pairs of wheels 96 and 97. Block 93 receives an axle 98 similar to axle 95, the axle 98 carrying pairs of wheels 99 and 100. Above shaft 83, the tubular portion of pedestal 86 is reinforced by means of upwardly and transversely extending gussets 101, which extend between the tubular portion and an integral plate-like formation 102.

Pedestal 85 is of exactly the same construction as pedestal 86 and the two are mounted at equal distances from the central longitudinal line of the truck frame. The two pedestals, together with their appurtenances, constitute a sub-frame directly mounted on the wheels, this sub-frame being connected by shaft 83 with the main frame. It will be understood that each pedestal is rockable relative to the main frame about the axis of shaft 83 and that each set of wheels 78 and 79 is independently rockable about the axis of its associated shaft 91. This construction, which, in general, is well known, enables the truck wheels to conform to a road surface with substantially equalized transmission of load.

The rectangular frame constituted by members 80 to 82 has secured thereon a heavy plate 103 which extends fore and aft of the wheels 78 and 79 and from side to side of the frame. The central longitudinal frame member 81 supports the central portion of plate 103. A bifurcated king pin 105 straddles member 81 and is bolted thereto by means of a bolt 106, the lower end of the king pin being conformed to spacers 87 and 87' and resting thereon. Above the bifurcation the king pin seats in a recess 81 in member 81, see Figure 19. The king pin has an upper reduced portion 107 which passes through an aperture provided in plate 103, the aperture margins resting on the shoulder 107' beneath reduced portion 107 and being welded thereto, the top of shoulder 107' being flush with the top edge of member 81. The described mounting of the king pin gives it maximum rigidity and strength, these characteristics being essential in view of the fact that it is a draft-transmitting element. The lower portion of the king pin is held securely by frame member 81 which latter is rigidified by the spacers 87 and 87' which abut thereagainst. The upper portion of the king pin is securely held by plate 103 which in turn is bolted to the frame members as may be observed in Figure 9.

A plate 108 substantially coextensive with plate 102 is superposed on the latter and has a central aperture receiving the king pin extension 107, this extension serving as a pivoting axis for plate 108, the latter constituting the main element of a turntable operably rotatable on plate 103. The king pin has a further extension 109 which is threaded and receives a nut 110 locked thereon by means of a bolt 111, there being a washer 112 interposed between the nut and plate 108.

Plate 103 is provided with two series of apertures 113 and 114 which are arranged on similar arcs having king pin 105 as their center. Plate 108 is provided with collared apertures spaced from the king pin so as to be simultaneously registerable with a selected pair of apertures 113 and 114 to receive pins 115 and 116 which serve to lock the main truck frame in desired angular relation to the turntable.

Figures 9, 10, 11, 12, 13:
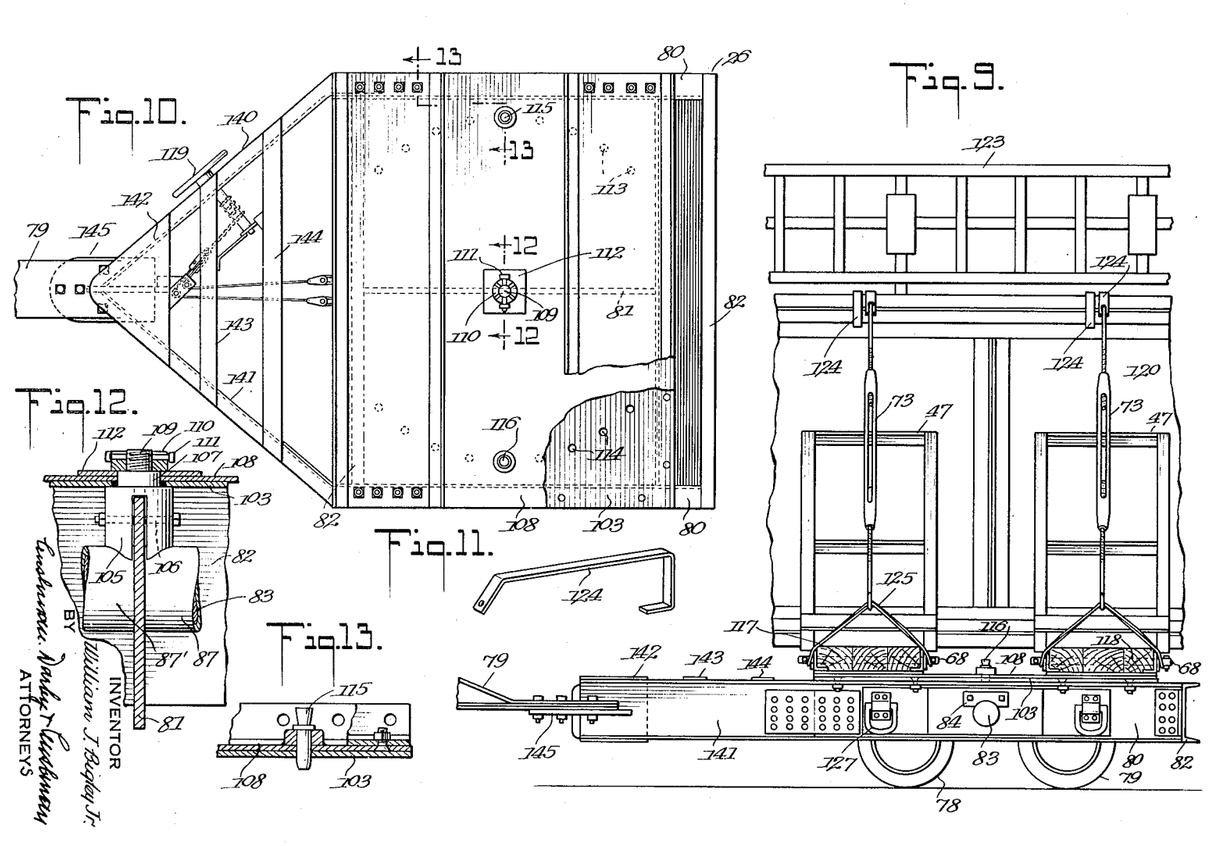
Figure 9 is an enlarged elevational view of the trailer shown in Figures 3 and 4, the front and rear trailers in these views being identical in construction.
Figure 10 is a plan view of the trailer of Figure 9, with parts broken away to reveal others.
Figure 11 shows in perspective a grapple which appears also in Figure 9.
Figure 12 is a section on line 12—12 of Figure 10.
Figure 13 is a section on line 13—13 of Figure 10.

Fore and aft of the king pin and at equal distances therefrom, two bolsters 117 and 118 are secured in parallel relation on plate 108. Since these bolsters are of exactly the same construction as bolster 38, heretofore referred to, their further description is unnecessary. As shown in Figure 13, the bottom plates are secured to plate 108 through bolts having countersunk heads.

Figure 1:
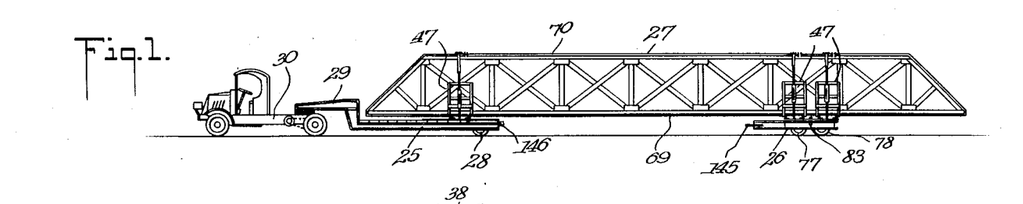
Figure 1 is an elevation of transporting apparatus for road use.
Figure 2:
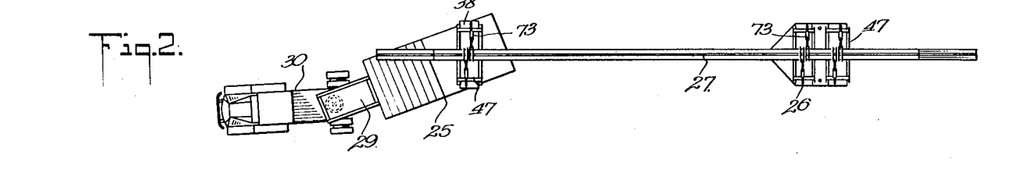
Figure 2 is a plan view of the apparatus of Figure 1.

With truck 26 placed as in Figures 1 and 2, it will be evident that the weight of the girder is received by the main truck frame through bolsters 117 and 118, which are at equal distances from the pivot shaft 83. Thus, the truck main frame is maintained in parallel relation to the girder with king pin 105 consequently always at right angles to the latter. Free movements of the subframe relative to the main frame and to the girder are permitted by reason of the pivotal mounting above discussed. Each bolster 117 and 118 carries a pair of frames 47 and each has a pair of guy elements extending between its outer ends and the top portion of the girder. In ordinary transportation, truck 26 occupies the position shown in Figure 2, wherein its wheel axes are at right angles to the vertical plane of the girder, the turntable being locked to the main frame to prevent relative rotation of the latter. However, when sharp turns must be made, pins 115 and 116 are temporarily removed and the main frame angled as required and temporarily locked in angled position if desired. The extended bearing surface between the turntable and the main frame is preferably kept well greased in order to facilitate the angling operation.

A triangular frame is secured to one end of the rectangular frame constituted by members 80 to 82 and comprises the angularly related members 140 and 141, an end gusset 142, and cross members 143 and 144. At the apex of this triangular frame is secured a horizontally projecting stub tongue 145 to which may be bolted the rear end of the main or extension tongue which may take the form shown in Figures 14 and 15. Wheel brakes are preferably provided, as shown, and this may be operated by a hand wheel 119 fixed on a drum shaft journaled in frame member 140, Figure 10.

In loading, the trailers 25 and 26 are stationed the proper distance apart as determined by the length of the girder to be transported. This disposition is readily accomplished due to the independence of the trailers prior to the loading thereon of the girder since the latter forms the sole connection between the trailers. When the rear trailer 26 is properly positioned a block is preferably placed under the projecting extremity of its main frame so as to support the latter in substantially horizontal position. The frames 47 having been properly positioned, the girder is picked up and lowered between the frames to rest on edge on the bolsters. The guy elements, if used, are now placed and tensioned and the load is ready for movement.

Arrived at the job, the apparatus is preferably positioned so that, upon removal of the guy elements, the girder may be hooked onto, lifted, and dropped into final position in a single continuous operation. There is thus a tremendous saving in time over the old method of flat transportation, since, assuming the girders to have been shipped on edge by rail from the mill, they are retained always in this position and this is the position in which they are finally used. All operations of changing from edge to side disposition or vice versa are eliminated, and moreover, danger of damage arising from these operations is entirely done away with. Speed, ease of handling, and safety are prime attributes of the new method.

When the load has been removed from the trailers, stub tongue 145 of trailer 26 may be pivotally engaged with a suitable coupling 146 on the rear end of trailer 25 so that the empty trailers may be hauled in tandem.

In Figures 3 and 4, the trailers 26, as above stated, are equipped with extension tongues 79 and are so disposed relative to the girder 120 that the tongues extend beyond the ends of the latter. One of the tongues is shown as being connected through a suitable connection with the rear end of a truck 121, which is assumed to be the tractive unit. The other tongue is shown as being connected to the rear end of a truck 122, this connection being more or less temporary, truck 122 being utilized principally to angle the truck main frame relative to the turn table. However, either tongue is available for tractive or maneuvering purposes. Occasionally the rear truck is used as a pusher with the rear trailer straight or in angled relation to the girder in which relation it may be locked or free.

According to Figures 3 and 4, the girder 120 has relatively fragile superstructure 123 extending along its upper edge, the superstructure as shown being a railing assembled and mounted on the girder at the mill. The guy members are secured to the top portion of the girder and do not affect the railing so that the whole assembly may be transported without damage. The guy members are secured at their upper ends to grapples 124 of modified form, Figure 11, and at their lower ends are secured two looped cable sections 125 in whose looped ends are engaged the ends of outer pins 68. Such anchoring means for the lower ends of the guy means do not, of course, differ essentially from those described with reference to Figures 5 to 8 and are shown merely as alternative constructions. The ends of pins 68, or shackles 76, if desired, are used as anchoring means particularly when the extension pieces 58, 59, Figure 7, are used.

While it is desirable that the girder supporting means be of relatively small overall height so as to keep the weight low, the girder should be supported at a height which will enable it to swing over low obstructions such as fire hydrants which are often encountered at corners. In making short turns, the intermediate portion of the girder must frequently swing across the sidewalk.

Girder 120 is shown as being provided with vertical reinforcing strips 126 whose outer edges are substantially flush with the outer edges of the top and bottom webs of the girder. Under such circumstances, it is desirable that the trucks be so placed that these struts will be engaged as far as possible by the cross members of the frames 47 so that the frames may thus cooperate with the guy elements in preventing rocking of the girder.

In pulling up steep grades, a single truck is frequently insufficient to move the load. Auxiliary trucks may be connected to the trailers 26 by means of cables engaged in rings as at 127, Figure 9, secured to the sides of the trailer main frames. When unloaded, the rear trailer may be hauled by hooking its tongue 79 into a coupling 150 on the rear end of the front trailer.

Figure 20:
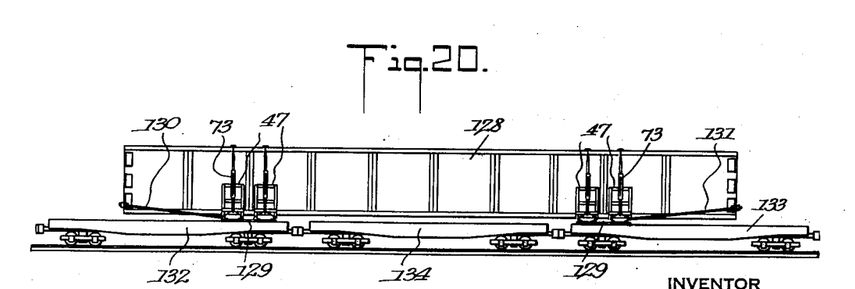
Figure 20 is an elevation showing a girder mounted, as contemplated under the present invention, for transportation on railroad cars.

In Figure 20, I have shown a girder 128 mounted for transportation on flat cars. The girder is supported at each end on a turntable 129 pivoted to a car and directly above the vertical axis of the car truck as here shown, the turntable 129 being exactly the same in construction as turntable 108 above described and similarly supporting a pair of bolsters upon which the girder rests. A wear plate such as plate 103, Figure 10, is secured to the car floor beneath the turntable and a suitable pivot is provided. The disposition of the turntables on the cars is of course determined by the length of the girder, but the disposition shown is desirable where possible. No locking means need be provided for the turntables, since their free rotatability is necessary. Desirably, tension members as at 130 and 131 extend between the outer bolsters and the ends of the girder so as to prevent longitudinal displacement of the latter. The weight of the girder is taken by cars 132 and 133, idler car 134 merely acting as a spacer element between the load carrying cars. This arrangement differs from that shown in Figures 1 to 4 particularly in that in the latter figures the girder forms the sole connection between the supporting units.

The turntables with the frames or racks 41 constitute in offset self-contained cradles of adjustable capacity adapted to support girders of large depth, and the guy elements, which are substantially permanently associated with the turntables, as are the frames, are readily adjustable and easily applied and removed. I have thus provided a combination of means greatly facilitating loading and unloading of large girders and enabling the girders to be carried on edge, thus affording numerous advantages as above discussed. The turntables may, of course, be associated with any type of movable supporting means and their use is not confined to any particular type of truck, trailer, or car, as will be understood.

Referring to Figure 6, the right and left hand frames or racks are shown in full and dotted line positions. In the full line position, the frames are shown as properly positioned to receive the lower web 60 of girder 27 to positively position the latter. The dotted position at the right shows the frame moved inwardly as when a girder with a narrower bottom web is to be transported.

The dotted position at the left of Figure 6 shows the frame as swung outwardly about the outer pin 68 upon removal of the inner pin 68. It is assumed here that the girder is being unloaded from the left and that additional clearance is necessary or desirable to permit free upward movement of the girder. Under these circumstances, all the left hand frames are swung outwardly so that upon being lifted the girder may rock to the left. For example, the girders sometimes have lateral projections which would catch under the frame cross pieces if it were attempted to move the girders upwardly without permitting them to free themselves as by swinging the side frames outwardly on one or both sides. Ordinarily it is sufficient to swing out only the frames on that side from which the girder is being unloaded. Cross pieces 54 serve to limit swinging of the frames when the latter are positioned sufficiently inwardly so that the cross pieces can abut the outer ends of the bolsters.

When possible, I prefer to haul at least a pair of girders together, since they provide a broad supporting base and mutually support each other to some degree. A girder of large depth is considered herein to be one which when placed on edge has practically no lateral stability and would immediately tend to fall over, if disturbed, unless restrained by adequate means.

While I have described specific embodiments of the invention, it will be understood that the construction may be varied considerably as to details without departure from the invention. Accordingly, I do not limit myself except as in the following claims.

I claim:—

1. For use in apparatus of the class described, a bolster comprising a channel unit and in the channel thereof a plank filler whose top surface is above the free edges of the channel side walls, said walls and the filler being provided with a plurality of pairs of aligned apertures, a frame having foot portions positioned outwardly of said side walls and provided with apertures registrable with selected pairs of the first named apertures, and pins engageable in the registered apertures to secure the frame to the bolster.

2. Transportation means for girders of large length and depth, said means including a bolster and bracing frames, said bolster comprising parallel upstanding longitudinally extending flanges having aligned apertures therein, said frames each comprising an inner vertical portion and an outwardly and downwardly inclined bracing portion, each portion of each of said frames having apertures therein registrable with apertures in the bolster flanges, means passed through the registering apertures to maintain the frames in position on the bolster with their upright portions face to face, and guy members secured at the outer ends of the bolster and adapted to be engaged with the top edge of a girder, said frames being relatively positioned to limit side movement of the bottom flange of a girder and being of substantial height relative to the depth of the girder to be transported, the guy members serving as primary positioning means for the upper portion of a girder having a depth greater than the height of said frames and in such case the top of the frames serving to limit positive tilting of the girder in the event of breakage of the guy members.

3. Transportation means for girders of large length and depth, said means including a bolster and bracing frames, said bolster comprising upstanding longitudinally extending flanges adapted to receive a wear plate filler therebetween and having aligned apertures therein, said frames each comprising an inner vertical portion and an outwardly and downwardly inclined bracing portion, each portion of each of said frames having apertures therein registering with apertures in the bolster and flanges, and means extending through the registering apertures to maintain the frames in position on the bolster with their upright portions face to face.

4. Means for supporting a girder of large length and depth for transportation on edge and permitting bodily upward unloading of the girder from the supporting means without dismantling of the latter, said means comprising a horizontal metal structure on which the girder is adapted to be disposed in transversely extending relation, bracing means comprising vertical members secured at their lower ends to said metal structure at the sides of the girder in position to positively limit lateral bodily movement of the latter, said vertical members being of a height to positively limit lateral tilting of the girder, and members sloping outwardly and downwardly from said vertical members and having their ends secured to the upper portion of said vertical members and to said metal structure respectively, said horizontal metal structure and bracing frames constituting a self-contained unit.

5. Means for supporting a girder of large length and depth for transportation on edge and permitting bodily upward unloading of the girder from the supporting means without dismantling of the latter, said means comprising a horizontal metal structure on which the girder is adapted to be disposed in transversely extending relation, bracing means comprising vertical members secured at their lower ends to said metal structure at the sides of the girder in position to positively limit lateral bodily movement of the latter, said vertical members being of a height to positively limit lateral tilting of the girder, and members sloping outwardly and downwardly from said vertical members and having their ends secured to the upper portion of said vertical members and to said metal structure respectively, said horizontal metal structure and bracing frames constituting a self-contained unit, said bracing means being positionable in different spaced relation on said metal structure.

6. Means for supporting a girder of large length and depth for transportation on edge and permitting bodily upward unloading of the girder from the supporting means without dismantling of the latter, said means comprising a horizontal metal structure on which the girder is adapted to be disposed in transversely extending relation, said structure comprising upstanding longitudinally extending flanges adapted to receive a wear plate filler therebetween, bracing means comprising vertical members secured at their lower ends to said metal structure at the sides of the girder in position to positively limit the lateral bodily movement of the latter, said vertical members being of a height to positively limit lateral tilting of the girder, and members sloping outwardly and downwardly from said vertical members and having their ends secured to the upper portions of said vertical members and to said metal structure respectively, said horizontal metal structure and bracing frames constituting a self-contained unit.

WILLIAM J. BIGLEY, Jr.